United States Patent
Weinzaepfel et al.

(10) Patent No.: US 11,625,953 B2
(45) Date of Patent: Apr. 11, 2023

(54) ACTION RECOGNITION USING IMPLICIT POSE REPRESENTATIONS

(71) Applicant: NAVER CORPORATION, Gyeonggi-do (KR)

(72) Inventors: Philippe Weinzaepfel, Montbonnot-Saint-Martin (FR); Gregory Rogez, Gières (FR)

(73) Assignee: NAVER CORPORATION, Gyeonggi-Do (KR)

( * ) Notice: Subject to any disclaimer, the term of this patent is extended or adjusted under 35 U.S.C. 154(b) by 108 days.

(21) Appl. No.: 16/903,527

(22) Filed: Jun. 17, 2020

(65) Prior Publication Data

US 2021/0073525 A1 Mar. 11, 2021

(30) Foreign Application Priority Data

Sep. 11, 2019 (EP) .................................... 19306098

(51) Int. Cl.
*G06V 40/20* (2022.01)
*G06K 9/62* (2022.01)

(52) U.S. Cl.
CPC ............. *G06V 40/20* (2022.01); *G06K 9/628* (2013.01); *G06K 9/6269* (2013.01)

(58) Field of Classification Search
None
See application file for complete search history.

(56) References Cited

U.S. PATENT DOCUMENTS

| | | | |
|---|---|---|---|
| 2015/0310265 A1* | 10/2015 | Suerth | G06V 10/42 382/103 |
| 2017/0255832 A1* | 9/2017 | Jones | G06N 3/0454 |
| 2017/0316578 A1* | 11/2017 | Fua | G06T 7/246 |
| 2019/0176820 A1* | 6/2019 | Pindeus | B60W 30/09 |

OTHER PUBLICATIONS

3D Human pose estimation in video with temporal convolutions and semi-supervised training, by Pavllo et al., arXiv:1811.11742v2 [cs.CV] Mar. 29, 2019 (Year: 2019).*

A unified deep framework for join 3D pose estimation and action recognition from a single RGB camera, by Pham et al. arXiv:1907.06968v1 [cs CV] Jul. 16, 2019 (Year: 2019).*

Hsu, Ken, David Brady, and Demetri Psaltis. 'Experimental Demonstrations of Optical Neural Computers'. In *Neural Information Processing Systems*, edited by D. Anderson, 377-386. American Institute of Physics, 1988. <https://proceedings.neurips.cc/paper/1987/file/8f14e45fceea167a5a36dedd4bea2543-Paper.pdf>. . . .

(Continued)

*Primary Examiner* — Vikkram Bali

(57) ABSTRACT

A computer-implemented method of recognition of actions performed by individuals includes: by one or more processors, obtaining images including at least a portion of an individual; by the one or more processors, based on the images, generating implicit representations of poses of the individual in the images; and by the one or more processors, determining an action performed by the individual and captured in the images by classifying the implicit representations of the poses of the individual.

15 Claims, 11 Drawing Sheets

(56) References Cited

OTHER PUBLICATIONS

A. Krizhevsky, I. Sutskever, and G. E. Hinton. ImageNet classification with deep convolutional neural networks. In NIPS, 2012.
A. Shahroudy, J. Liu, T.-T. Ng, and G. Wang. NTU RGB+D: A large scale dataset for 3D human activity analysis. In CVPR, 2016.
A. Yao, J. Gall, and L. van Gool. Coupled action recognition and pose estimation from multiple views. IJCV, 2012.
C. Cao, Y. Zhang, C. Zhang, and H. Lu. Action recognition with joints-pooled 3D deep convolutional descriptors. In IJCAI, 2016.
C. Feichtenhofer, A. Pinz, and A. Zisserman. Convolutional two-stream network fusion for video action recognition. In CVPR, 2016.
C. Si, Y. Jing, W. Wang, L. Wang, and T. Tan. Skeleton-based action recognition with spatial reasoning and temporal stack learning. In ECCV, 2018.
C. Szegedy, W. Liu, Y. Jia, P. Sermanet, S. Reed, D. Anguelov, D. Erhan, V. Vanhoucke, and A. Rabinovich. Going deeper with convolutions. In CVPR, 2015.
D. C. Luvizon, D. Picard, and H. Tabia. 2D/3D pose estimation and action recognition using multitask deep learning. In CVPR, 2018.
D. Tran, H. Wang, L. Torresani, J. Ray, Y. LeCun, and M. Paluri. A closer look at spatiotemporal convolutions for action recognition. In CVPR, 2018.
D. Tran, L. Bourdev, R. Fergus, L. Torresani, and M. Paluri. Learning spatiotemporal features with 3D convolutional networks. In ICCV, 2015.
F. Angelini, Z. Fu, Y. Long, L. Shao, and S. M. Naqvi. ActionXPose: A Novel 2D Multi-view Pose-based Algorithm for Real-time Human Action Recognition. arXiv preprint arXiv:1810.12126, 2018.
G. Ch'eron, I. Laptev, and C. Schmid. P-CNN: Pose-based CNN features for action recognition. In ICCV, 2015.
G. Gkioxari and J. Malik. Finding action tubes. In CVPR, 2015.
G. Rogez, P. Weinzaepfel, and C. Schmid. LCR-Net++: Multi-person 2D and 3D pose detection in natural images. IEEE trans. PAMI, 2019.
G. Singh, S. Saha, M. Sapienza, P. H. Torr, and F. Cuzzolin. Online real-time multiple spatiotemporal action localisation and prediction. In ICCV, 2017.
H. Jhuang, J. Gall, S. Zuffi, C. Schmid, and M. J. Black. Towards understanding action recognition. In ICCV, 2013.
H. Kuehne, H. Jhuang, E. Garrote, T. Poggio, and T. Serre. HMDB: a large video database for human motion recognition. In ICCV, 2011.
J. Carreira and A. Zisserman. Quo vadis, action recognition? A new model and the Kinetics dataset. In CVPR, 2017.
J. Donahue, L. Anne Hendricks, S. Guadarrama, M. Rohrbach, S. Venugopalan, K. Saenko, and T. Darrell. Long-term recurrent convolutional networks for visual recognition and description. In CVPR, 2015.
J. Liu, A. Shahroudy, D. Xu, and G. Wang. Spatio-temporal LSTM with trust gates for 3D human action recognition. In ECCV, 2016.
J. Weng, M. Liu, X. Jiang, and J. Yuan. Deformable pose traversal convolution for 3d action and gesture recognition. In ECCV, 2018.
J. Zhu, W. Zou, L. Xu, Y. Hu, Z. Zhu, M. Chang, J. Huang, G. Huang, and D. Du. Action machine: Rethinking action recognition in trimmed videos. arXiv preprint arXiv:1812.05770, 2018.
K. Hara, H. Kataoka, and Y. Satoh. Can spatiotemporal 3D CNNs retrace the history of 2D CNNs and ImageNet. In CVPR, 2018.
K. He, X. Zhang, S. Ren, and J. Sun. Deep residual learning for image recognition. In CVPR, 2016.
K. Simonyan and A. Zisserman. Two-stream convolutional networks for action recognition in videos. In NIPS, 2014.
K. Soomro, A. R. Zamir, and M. Shah. UCF101: A Dataset of 101 Human Actions Classes From Videos in The Wild. In CRCV-TR-12-01, 2012.
L.Wang, Y. Xiong, Z.Wang, Y. Qiao, D. Lin, X. Tang, and L. Van Gool. Temporal segment networks: Towards good practices for deep action recognition. In ECCV, 2016.
M. Liu and J. Yuan. Recognizing human actions as the evolution of pose estimation maps. In CVPR, 2018.
M. Zolfaghari, G. L. Oliveira, N. Sedaghat, and T. Brox. Chained multi-stream networks exploiting pose, motion, and appearance for action classification and detection. In ICCV, 2017.
P. Weinzaepfel, Z. Harchaoui, and C. Schmid. Learning to track for spatio-temporal action localization. In ICCV, 2015.
R. Girdhar and D. Ramanan. Attentional pooling for action recognition. In NIPS, 2017.
S. Ren, K. He, R. Girshick, and J. Sun. Faster R-CNN: Towards real-time object detection with region proposal networks. In NIPS, 2015.
S. Saha, G. Singh, M. Sapienza, P. H. Torr, and F. Cuzzolin. Deep learning for detecting multiple space-time action tubes in videos. In BMVC, 2016.
S. Xie, C. Sun, J. Huang, Z. Tu, and K. Murphy. Rethinking spatiotemporal feature learning: Speed-accuracy trade-offs in video classification. In ECCV, 2018.
S. Xie, R. Girshick, P. Doll'ar, Z. Tu, and K. He. Aggregated residual transformations for deep neural networks. In CVPR, 2017.
S. Yan, Y. Xiong, and D. Lin. Spatial temporal graph convolutional networks for skeleton-based action recognition. In AAAI, 2018.
U. Iqbal, M. Garbade, and J. Gall. Pose for action—action for pose. In International Conference on Automatic Face & Gesture Recognition (FG), 2017.
V. Choutas, P. Weinzaepfel, J. Revaud, and C. Schmid. Potion: Pose motion representation for action recognition. In CVPR, 2018.
V. Kalogeiton, P. Weinzaepfel, V. Ferrari, and C. Schmid. Action tubelet detector for spatio-temporal action localization. In ICCV, 2017.
W. Du, Y. Wang, and Y. Qiao. RPAN: An end-to-end recurrent pose-attention network for action recognition in videos. In ICCV, 2017.
W. Kay, J. Carreira, K. Simonyan, B. Zhang, C. Hillier, S. Vijayanarasimhan, F. Viola, T. Green, T. Back, P. Natsev, et al. The Kinetics human action video dataset. arXiv preprint arXiv:1705.06950, 2017.
W. McNally, A. Wong, and J. McPhee. STAR-Net: Action recognition using spatio-temporal activation reprojection. arXiv preprint arXiv:1902.10024, 2019.
W. Wang, J. Zhang, C. Si, and L. Wang. Pose-based two-stream relational networks for action recognition in videos. arXiv preprint arXiv:1805.08484, 2018.
W. Zhang, M. Zhu, and K. G. Derpanis. From actemes to action: A strongly-supervised representation for detailed action understanding. In ICCV, 2013.
W. Zhu, C. Lan, J. Xing, Y. Li, L. Shen, W. Zeng, and X. Xie. Co-occurrence feature learning for skeleton based action recognition using regularized deep lstm networks. In AAAI, 2016.
Y. Du, W. Wang, and L. Wang. Hierarchical recurrent neural network for skeleton based action recognition. In CVPR, 2015.
Y. Du, Y. Fu, and L. Wang. Skeleton based action recognition with convolutional neural network. In ACPR, 2015.
Y. Li, Y. Li, and N. Vasconcelos. Resound: Towards action recognition without representation bias. In ECCV, 2018.
Z. Cao, G. Hidalgo, T. Simon, S.-E. Wei, and Y. Sheikh. OpenPose: realtime multi-person 2D pose estimation using PartAffinity Fields. In arXiv preprint arXiv:1812.08008, 2018.
Amlaan Bhoi: "Spatio-temporal Action Recognition: A Survey", Cornell University Library, XP081008726, Jan. 27, 2019.
European Search Report for European Application No. EP19306098.5 dated May 28, 2020.
European Search Report for European Application No. EP19306098.5 dated Mar. 6, 2020.
Girdhar Rohit et al.: "Detect-and-Track: Efficient Pose Estimation in Videos", IEEE/CVF Conference on Computer Vision and Pattern Recognition, XP033475995, pp. 350-359, Jun. 18, 2018.
Huy Hieu Pham et al.: "A Unified Deep Framework for Joint 3D Pose Estimation and Action Recognition from a Single RGB Camera" Cornell University Library, XP081442589, Jul. 16, 2019.
Mykhaylo Andriluka et al.: "Monocular 3D Pose Estimation and Tracking By Detection", IEEE Conference on Computer Vision and Pattern Recognition (CVPR), XP031725981, pp. 623-630, Jun. 13-18, 2010.

(56) References Cited

OTHER PUBLICATIONS

Papadopoulos Konstantinos et al.: "Two-Stage RGB-Based Action Detection Using Augmented 3D Poses", Robocup 2008: Robot Soccer World Cup XII; Lecture Notes in Computer Science; XP047517686, Aug. 22, 2019.
Philippe Weinzaepfel et al.: "Mimetics: Towards Understanding Human Actions Out of Context", Cornell University Library, XP081559473, Dec. 16, 2019.
Philippe Weinzaepfel et al.: "Real-World 3D Action Recognition using Implicit Pose Features", Mar. 26, 2019.
Sijie Yan et al.: "Spatial Temporal Graph Convolutional Netowkrs for Skeleton-Based Action Recognition" Cornell University Library, XP081208953, Jan. 23, 2018.
Xu Zineng et al.: "Action Tube Extraction Based 3D-CNN for RGB-D Action Recognition", International Conference on Content-Based Multimedia Indexing (CBMI), IEEE.
XP033432824, pp. 1-6; Sep. 4, 2018.

* cited by examiner

ACTION RECOGNITION USING IMPLICIT POSE REPRESENTATIONS

CROSS-REFERENCE TO RELATED APPLICATIONS

This application claims the benefit of EP Application number 19306098.5, filed on Sep. 11, 2019. The entire disclosure of the application referenced above is incorporated herein by reference.

FIELD

The present disclosure relates to action recognition and, more particularly, to systems and methods for classifying one or more images according to individual actions shown in these images.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Neural networks including convolutional neural networks (CNN) may be used, for example, in computer vision applications. Human action recognition is a challenging task in computer vision due to a large number and variability in possible actions and due to the importance of different cues (e.g., appearance, motion, pose, objects, etc.) for different actions. In addition, actions can span various temporal extents and can be performed at different speeds.

Some methods may be built upon two-stream architectures, Recurrent Neural Networks (RNNs), or spatiotemporal three dimensional (3D) convolutions. A method that is built on a deep spatiotemporal convolutional architecture and combines appearance and motion information in a two-stream architecture processes red green blue (RGB) video frames and the optical flow separately. This method can be accurate in determining human actions for specific datasets, like the Kinetics dataset.

Some drawbacks of these methods are the high computational costs for training and their complexity. Also, methods may not produce accurate human action predictions that are robust against some recording properties of the images like the camera movement or noise. Some datasets, and thus what Convolutional Neural Networks (CNNs) learn, may be biased against scenes and objects. While this contextual information may be useful to predict human actions, it is not sufficient for accurately determining human actions and truly understanding what is happening in a scene or an image.

Some methods for action recognition may leverage context such as scenes or objects instead of focusing on the human actions. These methods may therefore be error-prone, where context (e.g., a scene or an object) is only partially available, absent, or even misleading. Examples where context is partial, absent, or misleading include indoor surfing, with the right object but not in the usual place, a mime artist mimicking someone playing violin, where the object and the scene are absent, or soccer players mimicking a scene of bowling on a soccer field with a soccer ball, which corresponds to misleading context. 3D CNNs and other types of action recognition systems may fail to recognize these actions. FIG. 4 includes an example of misleading images.

Humans have a more complete understanding of actions and can even recognize them without any context, object, or scene. One particularly challenging example is the human action recognition of mimed actions. Mime artists can suggest emotions or actions to an audience using only facial expressions, gestures, and movements but without words or context.

Information carried by human poses can be used, for example, to understand mimed actions. Action recognition methods that take as input 3D skeleton data may be independent of contextual information. However, these methods may be employed in highly constrained environments where accurate data is acquired through motion capture systems or range sensors.

Real-world scenarios require dealing with a number of challenges that make the extraction of reliable full-body 3D human poses non-trivial. For example, these methods may be sensitive to noise, complex camera motions, image blur, and illumination artefacts, as well as occlusions and truncations of the human body. These challenges make 3D human pose estimation and, consequently, human action recognition, more difficult and may provide inaccurate results.

An explicit human pose may be defined by body key point coordinates, such as 3D coordinates $(x_i, y_i, z_i)$ with i key points (e.g., corresponding to joints of the human body) or skeleton data.

Methods that are based on explicit poses may require that humans are fully visible and may be limited to single-person action recognition. Some of these methods further rely only on 2D poses for the task of action recognition in real-world videos. Compared to 2D poses, 3D poses have the advantage of being unambiguous and representing motion dynamics better. However, 3D human poses may only be obtained from a motion capture system, a Kinect sensor, or a multi-camera setting, and cannot be derived from real-world videos.

Designing neural networks to capture spatiotemporal information is non-trivial. A neural network may be configured to produce a specific output, such as a classification result, based on an input. However, without knowledge about the specific structure of the neural network and its specific filters or weights, it may not be possible to determine or to evaluate based on which features a specific classification is made. Thus, a combination of two neural networks, or parts of these two neural networks, each based on a different idea and used for a specific purpose, may not guarantee a desired effect that could be assumed from different ideas alone. For example, if it is not clear on which specific features of an input a neural network bases its results, a combination with another neural network or a part of another neural network may not produce an expected or desired result. Determining whether a combination of two different approaches or networks provides a specific result can be expensive to evaluate.

There is a need in the art to address the problems of human action recognition. It would be desirable to provide an improved method for human action recognition that overcomes the above disadvantages. Specifically, it would be desirable to provide a method that accurately identifies one or more human actions based on one or more images.

SUMMARY

In order to overcome the above deficiencies and to address the problem of biased image classifications, systems and methods for accurately determining human actions are disclosed. The present disclosure presents methods and systems for improved action recognition that directly use implicit pose representations. While the embodiments of the summary are described with respect to human action recognition, the following may be used for individual action recognition, where individual is used herein to include humans, animals and inanimate objects, such as robots. An individual may be a living object and/or a moving object that may be part of a particular class, species, or collection.

In a feature, a computer-implemented method for human action recognition includes obtaining one or more images showing at least a portion of one or more humans, generating one or more implicit representations of one or more human poses based at least in part on the one or more images, and determining at least one human action by classifying one or more of the implicit representations of one or more human poses. By directly classifying one or more of the implicit representations of one or more human poses, an improved method system for action recognition that is robust with respect to context shown in the one or more images is provided. The at least one human action may be determined by classifying the one or more implicit representations of one or more human poses, instead of classifying an explicit representation of one or more human poses. By keeping the representation implicit, ambiguities in the representations need not be resolved, which provides for an efficient processing of these implicit representations compared to explicit representations.

In a feature, the one or more implicit representations of one or more human poses comprise one or more feature vectors generated by at least a part of a first neural network. The first neural network may be initially trained for determining two-dimensional (2D) and/or three-dimensional (3D) poses of humans. Alternatively or additionally, the at least one human action may be determined by classifying the one or more implicit representations of one or more human poses comprising the feature vectors by a second neural network, which may be different from the first neural network. The second neural network may be trained to classify the one or more feature vectors according to human actions. By classifying feature vectors generated by neural network for pose determination, the implicit representations of human poses can be generated in an efficient manner. For example, the feature vectors can be extracted from a first neural network that was initially trained for detecting human poses.

In further features, the obtaining one or more images includes: obtaining a sequence of images, such as a video and/or a sequence of Red-Green-Blue (RGB) images, the generating one or more implicit representations includes generating a sequence of implicit representations of human poses, and the determining the at least one human action includes concatenating implicit representations of the sequence of implicit representations of human poses and performing a convolution, such as a one-dimensional (1D) temporal convolution, on the concatenated implicit representations. The concatenating the implicit representations may include concatenating all implicit representations of the sequence of implicit representations. By performing a convolution on concatenated implicit pose representations, a human action can be determined in an efficient manner, since the spatiotemporal information is processed in a single operation (e.g. by means of a simple 1D convolution). This allows an uncomplicated architecture to implement this aspect compared to architectures with complex processing steps or multiple layers for encoding and processing the temporal information.

In further features, the method further includes determining one or more candidate boxes around each human or one or more humans partially or completely shown in at least one of the one or more images. The one or more implicit representations of one or more human poses may be generated based on the one or more candidate boxes and the one or more images. When the one or more images comprise a sequence of images, such as a video sequence, the method may further include extracting tubes based on the candidate boxes along the sequence of images. Additionally, the generating one or more implicit representations of one or more human poses may include generating a sequence of implicit representations of one or more human poses along the tubes. A 1D temporal convolution may be performed or applied on the sequence of implicit representations, which may be a sequence of feature vectors, such as stacked feature vectors, to determine the at least one human action. By generating implicit representations based on the one or more candidate boxes and the one or more images, the actions of one or multiple humans can be determined in a more precise manner. For example, Region-of-Interest (RoI)-pooling can be performed based on the candidate boxes to further increase the robustness with respect to context in the images.

In a feature, a computer-implemented method for training at least a part of a neural network for human action recognition or classification includes obtaining first sets of one or more images, like a video or a sequence of images, and first labels, which may describe an action shown in the one or more images and correspond to the first sets, generating sets of at least one feature vector by inputting at least one image of each set of the first sets of one or more images into a first neural network, the first neural network being trained for determining human poses, training at least a part of a second neural network for human action classification, such as one or more layers of the second neural network, based on the feature vectors of the sets of at least one feature vector. The feature vectors of the sets of at least one feature vector correspond to the inputted images and corresponding labels of the first labels, and the feature vectors are generated by at least a part of the first neural network. By training at least a part of a neural network for human action classification based on feature vectors generated by a neural network for human pose determination, a neural network for human action classification or recognition can be generated in a fast and efficient manner. For example, the neural network for human action classification or recognition may simply be combined with an already existing neural network for human pose determination or a part of such a neural network. Furthermore, by directly training a neural network on pose features or feature vectors of a neural network, which was initially trained for determining human poses, an improved neural network for action recognition can be generated that is robust with respect to context shown in images.

In further features, each of the first sets of one or more images includes a sequence of images, the feature vectors of the sets of at least one feature vector comprises a sequence of feature vectors corresponding at least partially to the sequence of images, and a plurality of feature vectors of the sequence of feature vectors is concatenated or stacked to train a temporal convolutional layer, such as a 1D temporal convolutional layer, of the second neural network with the plurality of concatenated or stacked feature vectors. By training a temporal convolutional layer of a neural network for action recognition with stacked features generated by neural network for pose detection, an architecture is provided or trained that processes the temporal and spatial information of images in a simplified manner. Accordingly, the costs for training a neural network for action recognition can be reduced.

In further features, the first neural network may be trained based on second sets of one or more images and second labels corresponding to the second sets prior to the second neural network. The weights of the first neural network may be frozen during the training of the second neural network. By freezing the weights of the first neural network during training, the training of the second neural network can be performed in an efficient and effective manner. For example, more processing recourses can be used for training a part of the neural network for action classification. This may include allowing larger temporal windows when sequences of feature vectors are used for the training. Alternatively, at least a part of the first neural network is jointly trained with the second neural network based on the first sets of images and the corresponding first labels. This allows improving the accuracy of the combination of first and second neural networks.

In further features, a computer-readable storage medium having computer-executable instructions stored thereon is provided. When executed by one or more processors, the computer-executable instructions perform the method for human action recognition or for training at least a part of a neural network for human action recognition described herein.

In further features, an apparatus comprising processing circuitry is provided. The processing circuitry is configured to perform the method for human action recognition or for training at least a part of a neural network for human action recognition described herein.

In a feature, a computer-implemented method of recognition of actions performed by individuals includes: by one or more processors, obtaining images including at least a portion of an individual; by the one or more processors, based on the images, generating implicit representations of poses of the individual in the images; and by the one or more processors, determining an action performed by the individual and captured in the images by classifying the implicit representations of the poses of the individual.

In further features, the implicit representations include feature vectors from which key points with three dimensional (3D) coordinates corresponding to a pose of a skeleton of the individual may be derived.

In further features, the implicit representations, which do not include key points with 3D coordinates, are used to derive key points corresponding to a pose of a skeleton of the individual.

In further features, the implicit representations do not include any 2 dimensional (2D) or three dimensional (3D) individual skeleton data.

In further features, the generating the implicit representations includes generating the implicit representations of the poses of the individual in the images using a first neural network.

In further features, the method further includes training the first neural network to determine at least one of two dimensional (2D) and three dimensional (3D) poses of individuals in images.

In further features, determining the action performed by the individual includes determining the action by classifying the implicit representations of the poses using a second neural network.

In further features, the implicit representations include feature vectors.

In further features, the method further includes training the second neural network to classify feature vectors according to actions by individuals.

In further features, the individual includes a human, the poses include human poses, and the action includes an action performed by a human.

In further features, the images include a sequence of images from a video.

In further features: generating the implicit representations includes generating the implicit representations based on the images, respectively; the method further includes concatenating the implicit representations to produce a concatenated implicit representation; and the determining the action includes performing a convolution on the concatenated implicit representation to produce a final implicit representation and determining the action performed by the individual by classifying the final implicit representation.

In further features, the convolution is a one dimensional (1D) convolution.

In further features, the convolution is a one dimensional (1D) temporal convolution.

In further features the method further includes, by the one or more processors, determining candidate boxes around individual captured in the images, where generating the implicit representations includes generating the implicit representations based on the candidate boxes.

In further features the method further includes, by the one or more processors, extracting tubes from the images based on the candidate boxes.

In further features, the method further includes determining the candidate boxes includes determining the candidate boxes using a regional proposal network (RPN) module.

In a feature, a computer-implemented method for training a neural network configured to recognize actions performed by individuals in images includes: by one or more processors, obtaining first images and first labels corresponding to actions performed by individuals in the first images, respectively; by the one or more processors, generating feature vectors by inputting ones of the first images into a first neural network configured to determine actions performed by individuals based on input images, the feature vectors being generated by the first neural network; and by the one or more processors, training a second neural network configured to recognize actions performed by individuals in images based on the feature vectors, where the feature vectors correspond to the input ones of the images and corresponding first labels.

In further features, the first images include sequences of images of individuals performing actions.

In further features, the method further includes, by the one or more processors, concatenating the feature vectors, where the training includes training a one-dimensional (1D) temporal convolutional layer of the second neural network using the concatenated feature vectors.

In further features, the method further includes: by the one or more processors, training the first neural network based on second images and second labels corresponding to the second images, where the training the second neural network includes training the second neural network after the training of the first neural network, and where weights of the first neural network are held constant frozen during the training of the second neural network.

In further features, the method further includes: jointly with the training of the second neural network, by the one or more processors, training the first neural network based on the first images and the first labels corresponding to the first images.

In a feature, a system includes: one or more processors; and memory including code that, when executed by the one or more processors, perform functions including: obtaining images including at least a portion of an individual; based on the images, generating implicit representations of poses of the individual in the images; and determining an action performed by the individual and captured in the images by classifying the implicit representations of the poses of the individual.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Described herein are systems and methods for human action recognition. For purposes of explanation, numerous examples and specific details are set forth in order to provide a thorough understanding of the described embodiments. Embodiments as defined by the claims may include some or all of the features in these examples alone or in combination with other features described below, and may further include modifications and equivalents of the features and concepts described herein. The illustrative embodiments will be described with reference to the drawings wherein elements and structures are indicated by reference numbers. Further, where an embodiment is a method, steps and elements of the method may be combinable in parallel or sequential execution. As far as they are not contradictory, all embodiments described below can be combined with each other. The methods described herein may be performed by one or more processors.

Figure 1:
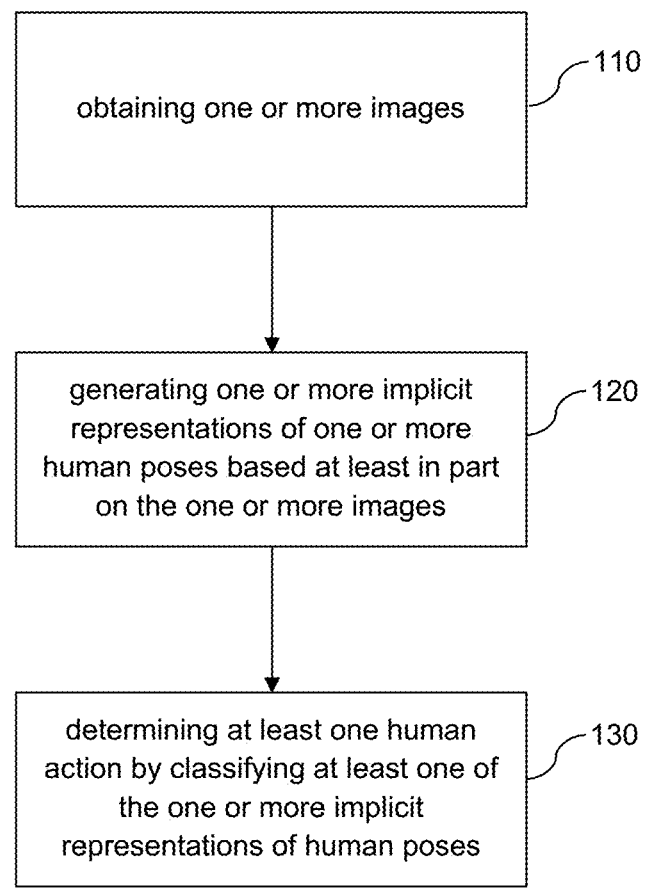
FIG. 1 illustrates a process flow diagram illustrating a method for human action recognition.

FIG. 1 is a process flow diagram of an example method 100 for human action recognition directly using one or more implicit representations of human poses, like human pose features, in accordance with an embodiment. Specifically, the method 100 may be used to predict actions, like human actions (actions performed by humans), that are captured in one or more images or that occur in a video. Videos are generated from a series of images captured over time.

At 110, one or more images are obtained, such as by one or more processors of a computing device. The one or more images may be, for example, captured using a camera of the computing device, obtained from memory of the computing device, received from another computing device (e.g., via a network) or obtained in another suitable manner. The one or more images may comprise a sequence of images or frames, such as trimmed videos. Trimmed videos mean that the videos last only a few seconds (e.g. 2 to 10 seconds) around a particular action performed by a human. The one or more obtained images can show at least a portion of one or more humans. In one example, the one or more images comprise videos such as real-world videos, videos from a website (e.g., YouTube, TikTok, etc.), television footage, movies, camera recordings, or videos captured from a mobile platform. The images or video may include a sequence of a plurality of RGB (red green blue) frames/images.

Figure 7:
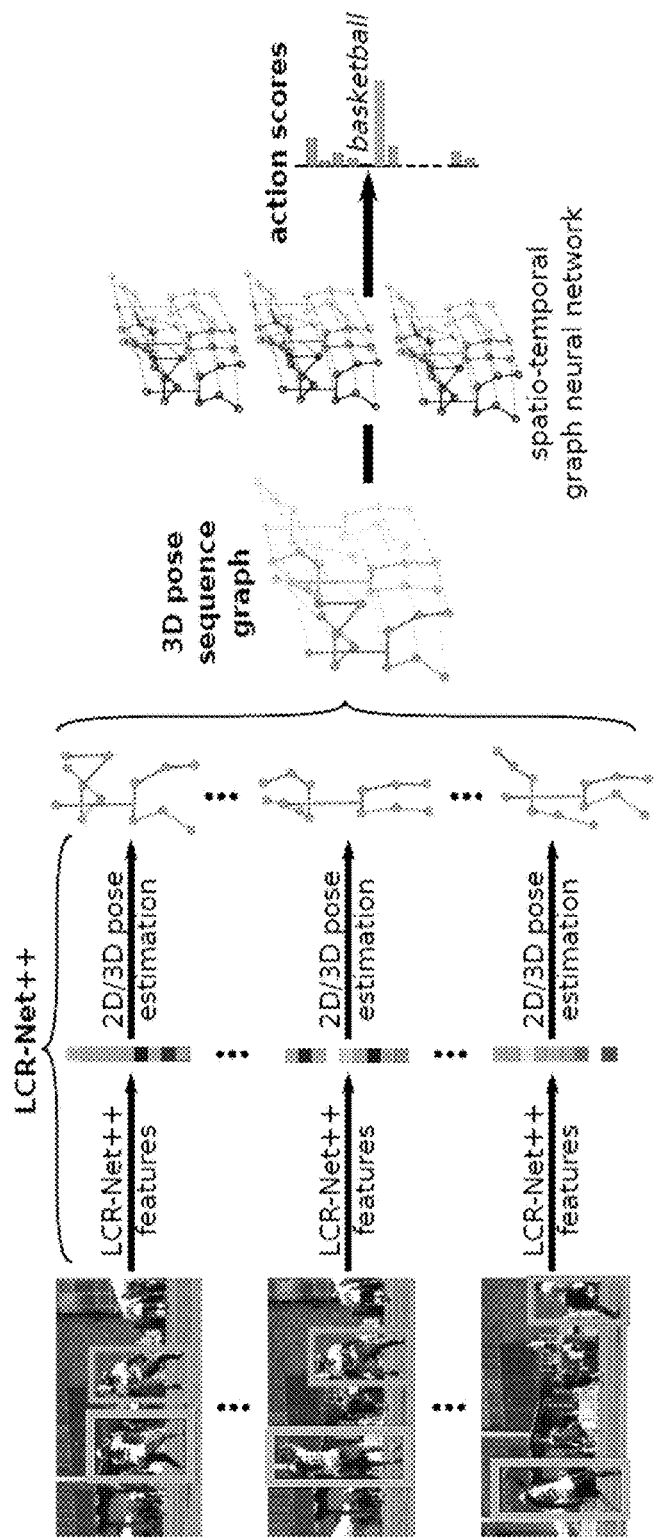
FIG. 7 shows a schematic drawing illustrating a technique for determining a human action from images.
Figure 8A:
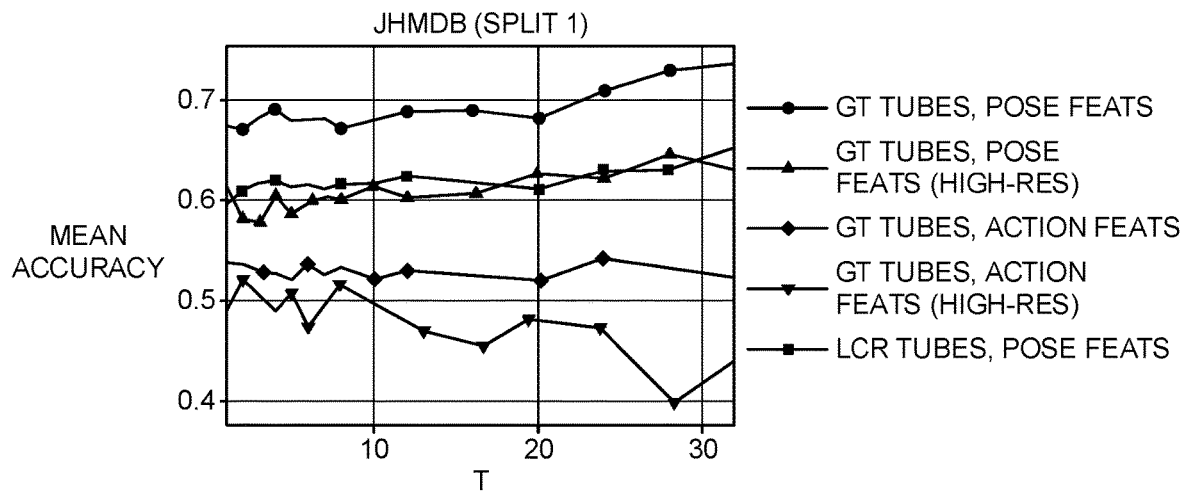
FIGS. 8A-F show plots of the mean accuracy as a function of the number of frames of input videos.
Figure 8B:
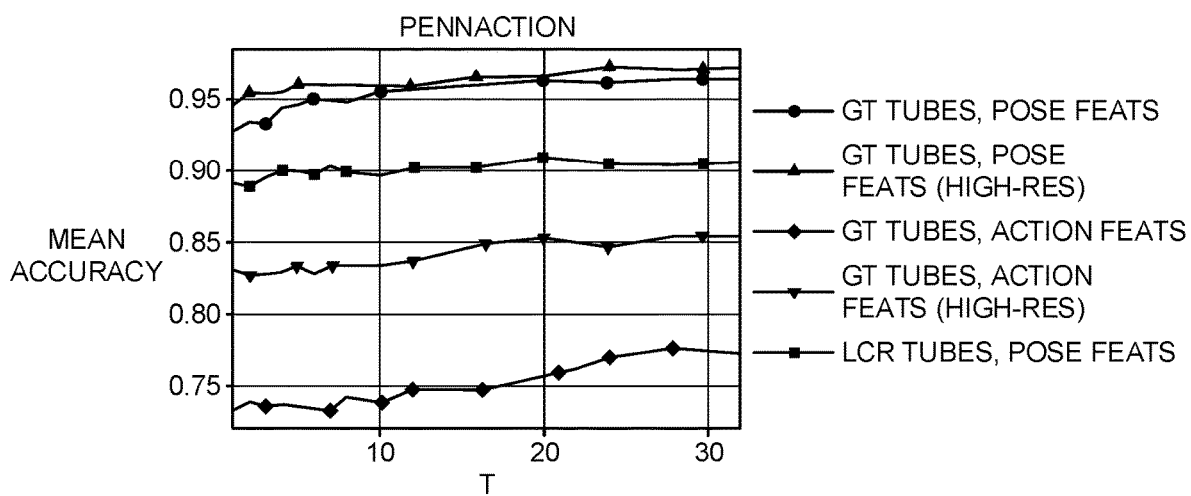
Figure 8C:
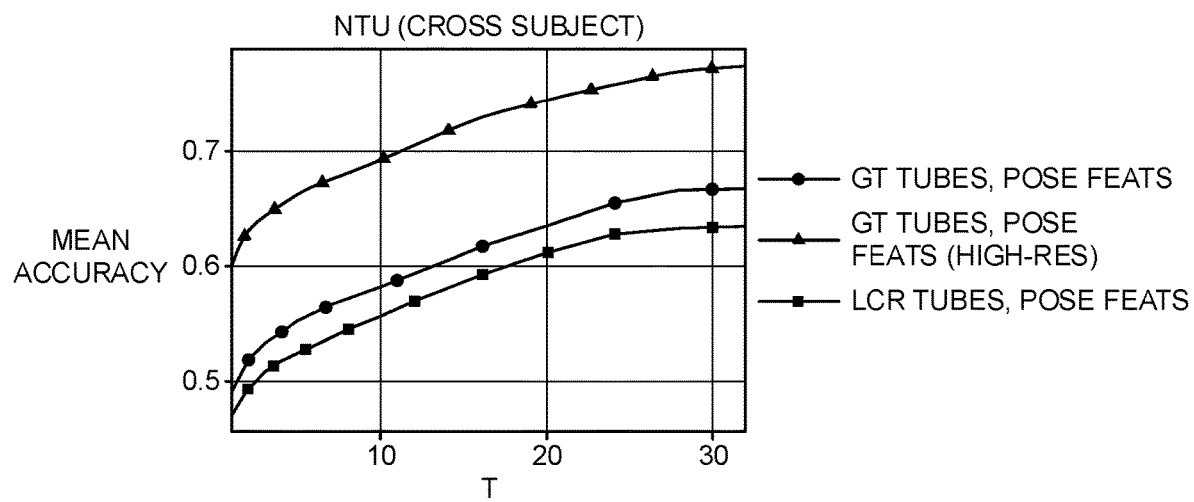
Figure 8D:
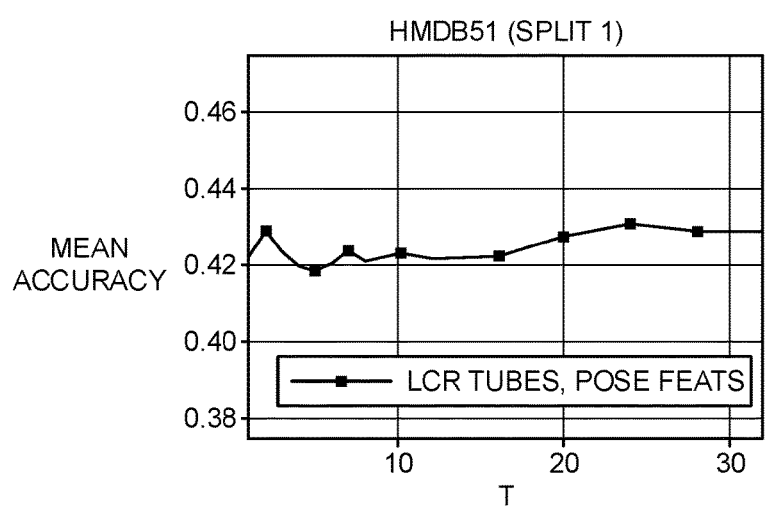
Figure 8E:
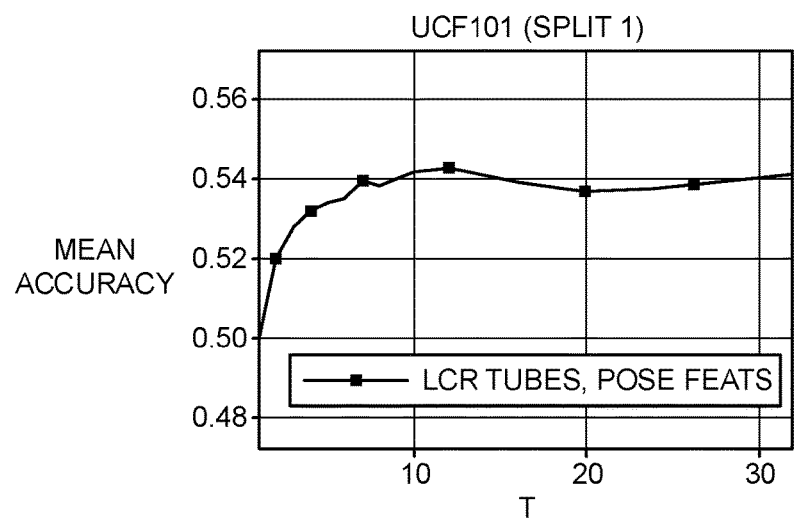
Figure 8F:
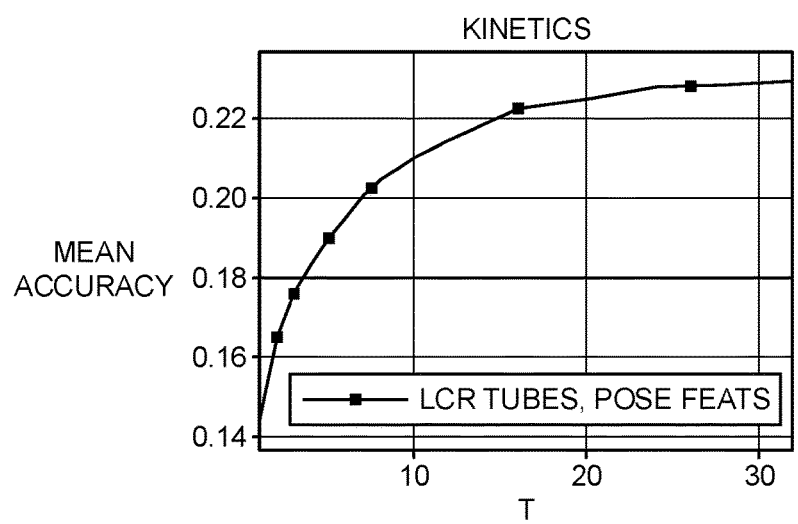

At 120, one or more implicit representations of one or more human poses are generated based at least in part on the one or more obtained images. An example of an implicit representation of a human pose may be a feature vector or a feature generated by at least a part of a first neural network, such as a pose detector module. The feature vector or feature may include a deep or mid-level 3D pose feature. The one or more implicit representations of the one or more human poses may represent information that relates to the one or more human poses or from which one or more human poses can be determined. Implicit representations of one or more human poses may include ambiguities regarding the one or more human poses. In contrast, an explicit representation of a human pose is unambiguously defined regarding the human pose. For example, an explicit representation of a human pose may comprise thirteen key points with each key point having known three dimensional (3D) coordinates ($x_i$, $y_i$, $z_i$). FIG. 7 includes an example stick figure including 39 key points (13 key points per frame/image*3=39). In contrast, an implicit representation of a pose may be a feature vector from which the 39 key points may be derived.

By keeping the representation implicit, ambiguities in the pose detection may need not be resolved, and thus allow for improved processing of these implicit representations compared to explicit representations. For example, the information content of implicit representations can be increased compared to explicit representations.

The first neural network can be a neural network that has been trained or that was initially trained to recognize or determine human poses, like two-dimensional (2D) and/or three-dimensional (3D) poses of humans. The one or more implicit representations of the one or more human poses may be generated based on single frames (or images) of a video. For example, the one or more implicit representations may be generated for one frame, two or more frames, or each frame of the video.

At 130, at least one human action is determined by classifying the one or more implicit representations of the one or more human poses. In various implementations, determining the at least one human action by classifying the one or more implicit representations of the one or more human poses is performed by a second neural network. The second neural network may be trained to classify one or more more feature vectors generated by a first neural network according to human actions. The method 100 may be performed by a neural network that comprises at least a part of the first neural network and the second neural network. The first neural network and the second neural network may be executed on a single computing device or server, or on distributed computing devices and/or servers.

Figure 2:
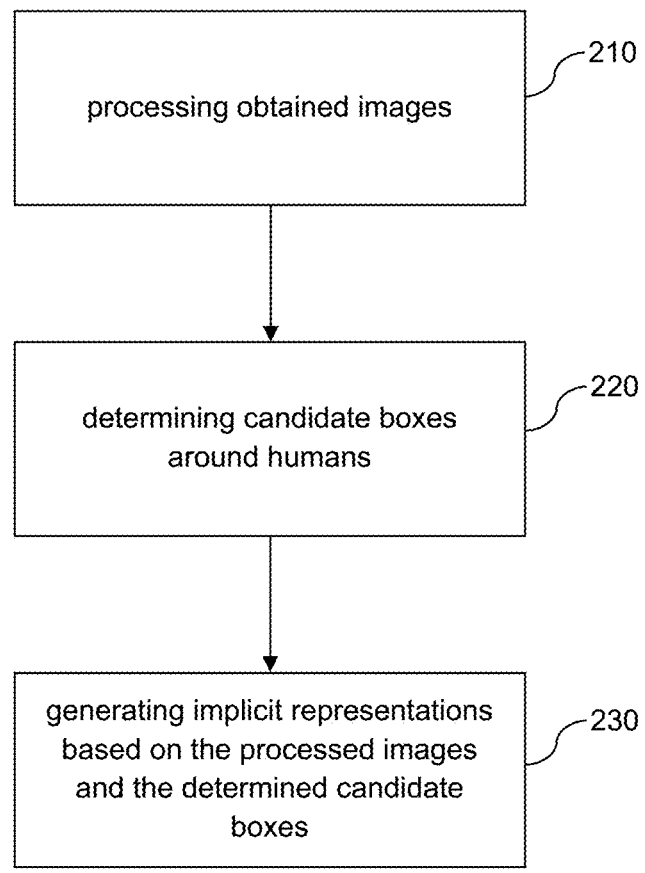
FIG. 2 illustrates a process flow diagram illustrating a method for generating implicit human pose representations.

FIG. 2 illustrates a process flow diagram of a method 200 for generating implicit human pose representations. Method 200 or one or more portions of the method 200 may be used to generate the one or more implicit representations of 120 of FIG. 1.

The method 200 may begin with 210, which includes processing obtained images. The processing may include inputting the obtained images into a first neural network or inputting the obtained images into one or more convolutional layers of a first neural network to generate feature vectors. The first neural network may be a deep convolutional neural network (CNN) configured to determine (e.g., implicit representations of) human poses.

At 220, one or more candidate boxes or bounding boxes are determined around humans shown in at least one of the one or more images. Example bounding boxes are shown around humans in FIG. 7. In embodiments, a Region Proposal Network (RPN) module is used to determine candidate boxes or bounding box around each human shown in an image of the one or more images. The candidate boxes may be determined based on the generated feature vectors or the processed images. In various implementations, a candidate box corresponds to a detected human pose or key point coordinates of a human.

At 230, the one or more implicit representations of the one or more human poses are generated based on the one or more candidate boxes and the processed images. The generation of the one or more implicit representations of the one or more human poses may include modifying the generated feature vectors by performing a Region of Interest (RoI)-pooling based on the determined candidate boxes. In this example, the one or more implicit representations of the one or more human poses include the one or more modified generated feature vectors.

Figure 3:
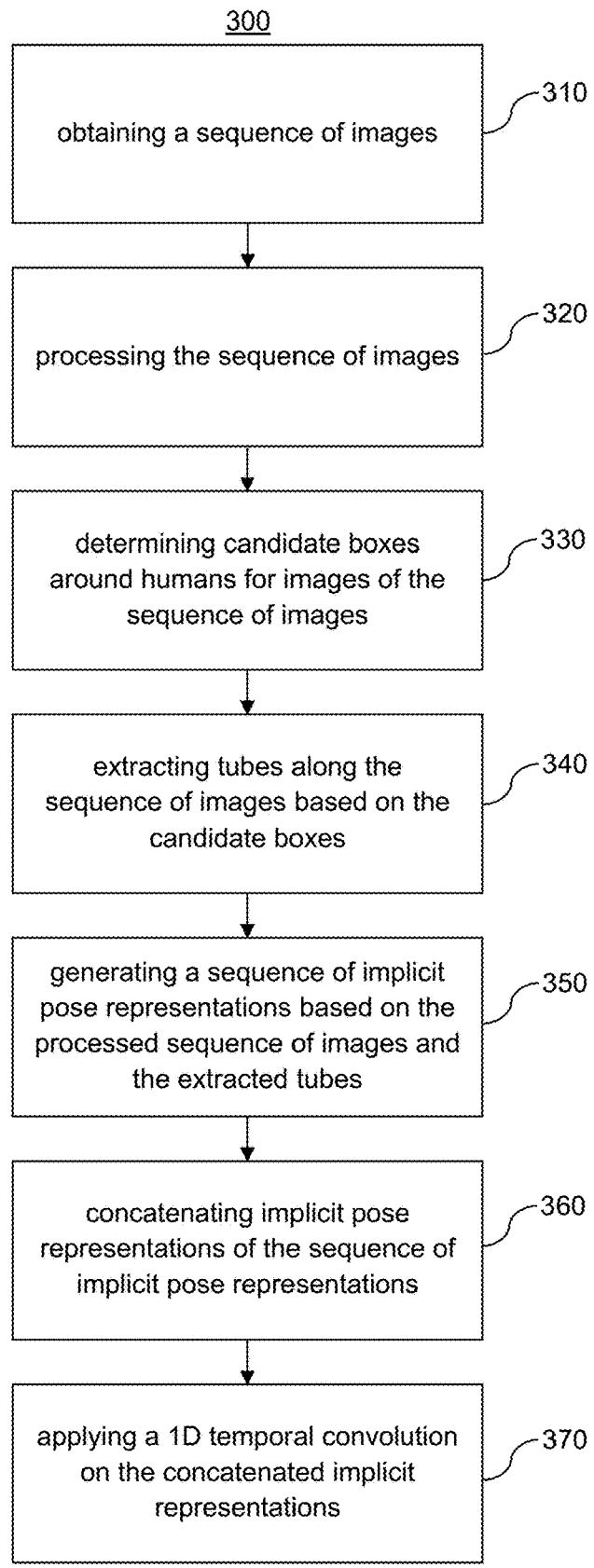
FIG. 3 illustrates a process flow diagram illustrating a method for human action recognition.

FIG. 3 illustrates a process flow diagram of a method 300 for human action recognition in accordance with at least one embodiment. One or more portions of the method 300 may correspond to one or more portions of method 100 of FIG. 1 and/or the method 200 of FIG. 2.

At 310, a sequence of images or frames is obtained. The sequence of images may be video, e.g., a video recorded by a camera, or a video obtained from a computer-readable medium. At 320, the sequence of images is processed. The processing may include inputting at least two images of the sequence of images into a first neural network or into one or more convolutional layers of the first neural network to obtain a sequence of feature vectors. In various implementations, each image or frame of the sequence of images or frames is processed to obtain the sequence of feature vectors.

At 330, candidate boxes around humans shown in the at least two images are determined, e.g., using the RPN module. The candidate boxes may be determined based on the generated feature vectors and/or based on detected humans in the at least two images. As described above, feature vectors generated by a human pose detector or a neural network for human pose detection may be implicit representations of human poses.

To determine the evolution of poses over time in the sequences of images, each human may be tracked over time. This may be achieved by linking candidate boxes around a human along the sequence of images.

At 340, tubes are extracted based on the determined candidate boxes along the sequence of the at least two images. A tube may be a temporal series of spatial candidate or bounding boxes, i.e., a spatiotemporal video tube. For example, to generate tubes, candidate boxes in sequential images may be linked. Starting from the candidate box with a highest scored detection of a human, the candidate box may be matched with the detections in the next frame, such as based on an Intersection-over-Union (IoU) between the candidate boxes. In one example, two candidate boxes in subsequent images of the sequence of images are linked when the IoU is greater than a predetermined value, such as 0.3. Otherwise, the candidate box will be matched with a candidate box of the image after the subsequent image, and a linear interpolation may be made for a candidate box of the missing image or candidate boxes of sequential images. A tube can be stopped, for example, when there was no match (e.g., IoU less than the predetermined value) during 10 consecutive images. This procedure can be run forward (the video in the forward temporal direction) and/or backward (the video in the backward temporal direction) to obtain a tube including a human. Then all detections in this first link can be deleted, and the procedure can be repeated for the remaining detections.

To summarize, the set of all human detections in all frames are first considered. The first link is then built, as described above. Next, a second link of bounding boxes that do not contain bounding boxes from the previous link(s) is built. To do so, the same process considering all the bounding boxes in all frames may be repeated, except the ones that have been linked before.

At 350, a sequence of implicit pose representations is generated based on the processed sequence of images and the extracted tubes. For example, the sequence of implicit pose representations may include feature vectors that have been generated by performing RoI-pooling on the processed images of the sequence of images.

At 360, the implicit pose representations of the sequence of implicit pose representations are concatenated or stacked end to end. At 370, a convolution may be applied on the concatenated or stacked representations to determine an action or a plurality of action scores. The convolution may be a one-dimensional (1D) temporal convolution or another suitable type of convolutional layer. Based on the results of the convolution, action scores may be determined and used to classify the concatenated or stacked representations according to actions. By using feature vectors as an implicit representation, ambiguities in the pose detection may need not be resolved, and a time convolution can be made in an efficient manner to produce the result.

In various implementations, an action recognition framework is disclosed that uses the implicit deep pose representation learned by a 3D pose detector, instead of explicitly estimating sequences of poses, such as 3D skeleton data, and operating on these sequences of explicit poses. An implicit deep pose representation has the advantage that it encodes pose ambiguities and does not require any tracking or temporal reasoning that a purely pose-based method may require to disambiguate complex cases. In at least one embodiment, the first neural network for pose determination includes a pose detector, such as the LCR-Net++ pose detector, the LCR-Net pose detector, or another suitable type of pose detector. The LCR-Net++ pose detector is discussed in "*LCR-Net++: Multi-person 2D and 3D pose detection in natural images*", by G. Rogez, P. Weinzaepfel, and C. Schmid, IEEE trans. PAMI, 2019. The LCR-Net++ pose detector may be robust in challenging cases like occlusions and truncations by image boundary. LCR-Net++ is configured for estimating full-body 2D and 3D poses for each one or more humans shown in an image. The human-level intermediate pose feature representations of the LCR-Net++ can be stacked, and a 1D temporal convolution can be applied on the stacked representations.

Figure 4:
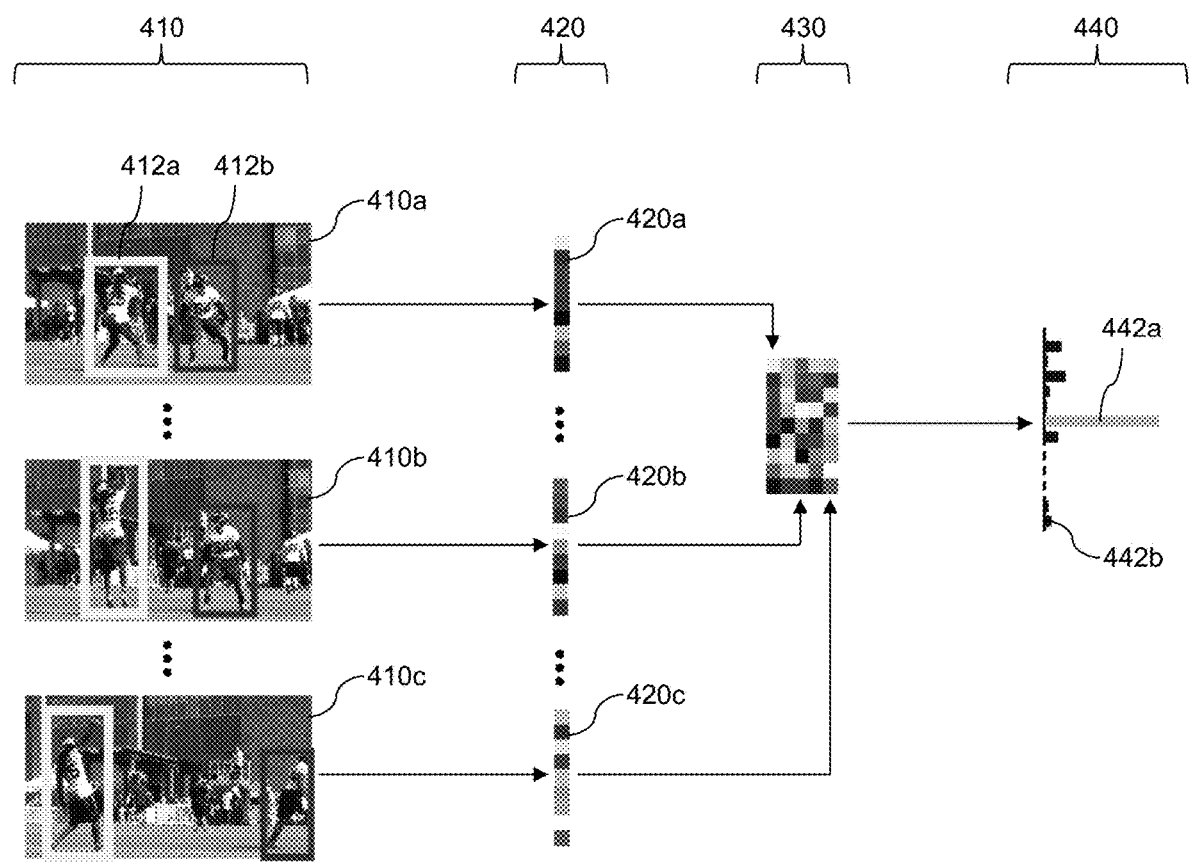
FIG. 4 shows a schematic drawing illustrating a technique for determining a human action from images.

FIG. 4 shows a schematic drawing illustrating a functional block diagram 400 for determining a human action from images. FIG. 4 shows three images 410a, 410b, and 410c forming a sequence of images 410 taken over time. However, a sequence of images can include two or more images. In this example, the images 410a, 410b, and 410c show humans dressed as American football players playing basketball (not American football) on an American football field. Accordingly, images 410a, 410b, and 410c include context that is related to American football, but shows an action, performed by two humans, that is unrelated or misleading with respect to the context of the images, namely the action of a human pretending to shoot or throw a basketball.

The images may be processed by at least a part of the first neural network for human pose detection. The first neural network or at least a part of a first neural network, like the RPN module, may be configured to determine candidate boxes 412a and 412b around humans shown in the images. Human tracks may be defined by tubes that are generated by linking candidate boxes around humans for each image of the sequence of images. The human tracks or tubes are shown in the same gray scale/color for a respective human along the sequence of images 410a-410c. Moreover, the first neural network or at least a part of a first neural network may be configured to generate a sequence of feature vectors 420 comprising feature vectors 420a, 420b, and 420c. In the example of FIG. 4, only for one human track/tube is shown for readability. The feature vectors 420a, 420b, and 420c correspond to the images 410a, 410b, and 410c. The feature vectors 420a, 420b, and 420c of the sequence of feature vectors may be mid-level pose features of the first neural network along human tracks.

After the generation of the sequence of feature vectors 420, the feature vectors 420a, 420b, and 420c are stacked/concatenated to leverage temporal information. The order of the stacked feature vectors 430 may correspond to the order of feature vectors 420a, 420b and 420c in the sequence of feature vectors 420 and/or the order of images 410a, 410b and 410b in the sequence of images 410. The stacked feature vectors 430 can be classified according to actions by determining action scores 440. Each classification may have an associated action, and classification with the highest action score may be selected to determine the action performed in the sequence.

In various implementations, the classification of the stacked feature vectors 430 may include inputting the stacked feature vectors 430 to the second neural network for action classification for classification by the second neural network. The second neural network may include one or more convolutional layers, such as a 1D convolutional layer. The second neural network may additionally or alternatively include one or more fully connected layers configured to output the action scores 440.

Based on the action scores 440, an action performed by a human in the sequence can be determined, such as by an action module. For example, action score 442a may be higher than action score 442b and all other action scores. Accordingly, the action module may determine that an action corresponding to action score 442a was performed in the sequence. In FIG. 4 the action score 442a corresponds to "playing basketball".

In various implementations, the action module may require that the highest action score be greater than a predetermined value (e.g., 0.5) in order to be considered a valid action. In such implementations, if the highest action score is less than the predetermined value, the action module may determine that no known action was performed in the sequence.

A system for action recognition may include a part of the first neural network configured to generate the feature vectors 420a, 420b, and 420c based on the sequence and the second neural network configured to determine the action in the sequence. The second neural network, which is configured to encode the temporal information of the sequence of images or feature vectors, may directly use the feature vectors or human pose features and may not need additional data such as a depth component in images/frames (e.g., RGB-d images or grayscale-d images). This provides for an improved system for action recognition that is robust against context.

In various implementations, single frame detections and deep mid-level 3D pose features may be generated using a 3D pose detector module. Temporal integration may be performed by generating tube proposals along which these implicit 3D pose-based features are concatenated and employed to directly classify the action being performed using a 1D temporal convolution layer.

The methods described herein are less prone to inherent pose estimation noise relative to other method of 3D action recognition used to estimate and classify sequences of 3D human poses. Moreover, other methods for 3D action recognition may include complex architectures for extracting the temporal information from sequences of images compared to embodiments described herein using a 1D temporal convolution.

In an example, an input video is at least partially processed by a pose detector module, e.g., LCR-Net++, to detect human tubes. Mid-level pose features can be extracted from the pose detector module processing the input video. The mid-level pose features, which may be generated based on the human tubes, can be stacked/concatenated over time. Then, a single 1D temporal convolution can be applied on the stacked pose features to obtain action scores. A single 1D temporal convolution, which is applied on the mid-level pose features, may be implemented in a 1D temporal convolution layer of a neural network. The 1D temporal convolution layer provides for a simple and uncomplicated architecture of the neural network to extract temporal information.

Figure 5:
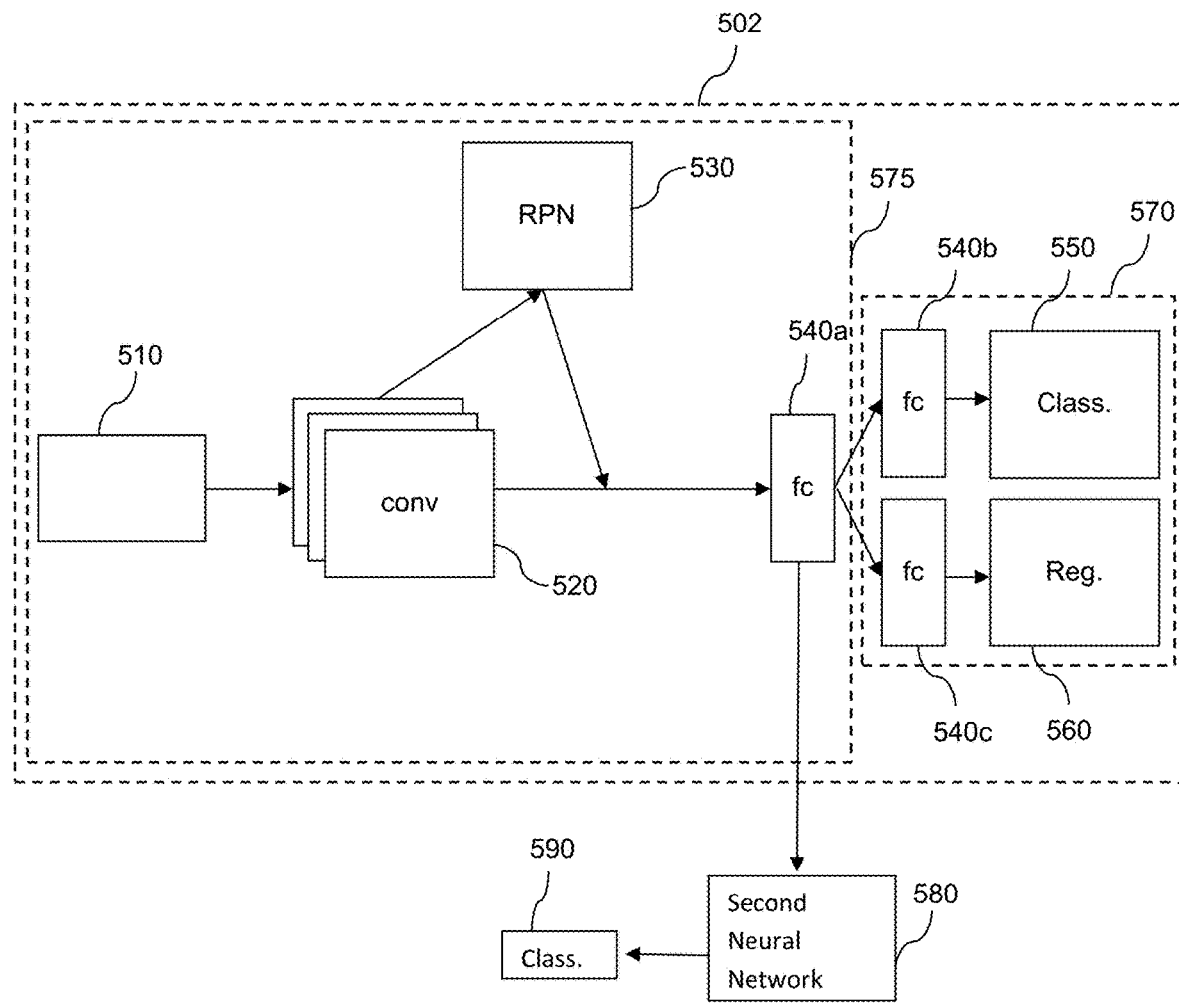
FIG. 5 illustrates an architecture of neural networks for human pose determination.

FIG. 5 is a functional block diagram including an example architecture 500 of neural networks for human pose determination. The architecture 500 includes a neural network (module) 502. The neural network 502 may be or include the first neural network mentioned herein. The neural network 502 is configured to determine a pose for each human completely or partially shown in an image 510 input into the neural network 502.

The neural network 502 includes one or more convolutional layers 520, and may include a Region Proposal Network (RPN) module 530, a classification module 550 and a regression module 560. Moreover, the neural network 502 may include one or more fully connected (fc) layers 540. The fully connected layer 540a is configured to generate, based on the output of the convolutional layers 520, an implicit representation that is used as input to the second neural network 580. The fully connected layers 540b and 540c are configured to generate explicit representations based on the output of the fully connected layer 540a. The classification and regression modules 550 and 560 may determine the classification and perform regression on the outputs of the fully connected layers 540b and 540c. Fully connected layer 540a generates an implicit representation as it may be used to estimate a pose but may not be used for specifying a pose directly, as may be done by the fully connected layers 540b and 540c.

The RPN module 530 is configured to extract candidate boxes around humans. In embodiments, pose proposals are determined by the RPN module 530 by matching/fitting poses of humans in the candidate boxes with/to predetermined anchor-poses and placing the anchor poses into the candidate boxes. The pose proposals are scored by the classification module 550 and refined (regressed) by the regression module 560. The regression module 560 may include class-specific regressors trained independently for each anchor-pose.

The anchor poses may be key poses that correspond to a human standing, a human sitting, and other common human poses. Each anchor pose includes a plurality of keypoints. The regression module 560 may take as input the same features as those used for the classification in the classification module 550. Anchor-poses may be defined jointly in 2D and 3D, and the refinement/regression may occur in this joint 2D-3D pose space.

In various implementations, the neural network 502 is configured to detect multiple people in scenes and images and/or to output full-body poses, even in case of occlusions or truncation by image boundaries. In the example of truncations at image boundaries, the neural network 502 may truncate a full-body pose at the same keypoint(s). The results may be generated in real-time. The neural network 502 may comprise a Faster R-CNN like architecture.

The neural network 502 may be configured to extract human tubes or to track humans from a sequence of images, such as a video. In this example, each image of the sequence of images or a subset of images of the sequence of images is input to the neural network 502 to detect the candidate boxes around humans for the subset of images. Then the candidate boxes of subsequent images are linked, for example, using Intersection-over-Union (IoU) between the candidate boxes.

In various implementations, the implicit representations of human poses include features or feature vectors used as input to the final layer for pose classification and to the final layer for joint 2D and 3D pose refinement/regression. These features may be selected and/or extracted and used for the human action classification. In examples, these features may include 2048 dimensions (or have another suitable dimension) and/or may be generated by a ResNet50 backbone or another suitable type of image classification algorithm.

Features generated by a neural network for pose detection, like the neural network 502, may encode (or include) information about both 2D and 3D poses. Accordingly, these features may include pose ambiguities. The methods described herein may directly classify these features to determine human actions and may not require any tracking or temporal reasoning that a purely pose-based method would require to disambiguate complex cases and situations. The features may simply be stacked over time along human tubes and a temporal convolution of a kernel size T may be applied on top of the resulting matrix, where T is the number of images of the sequence of images. This convolution may output action scores for the sequence of images.

Figure 6:
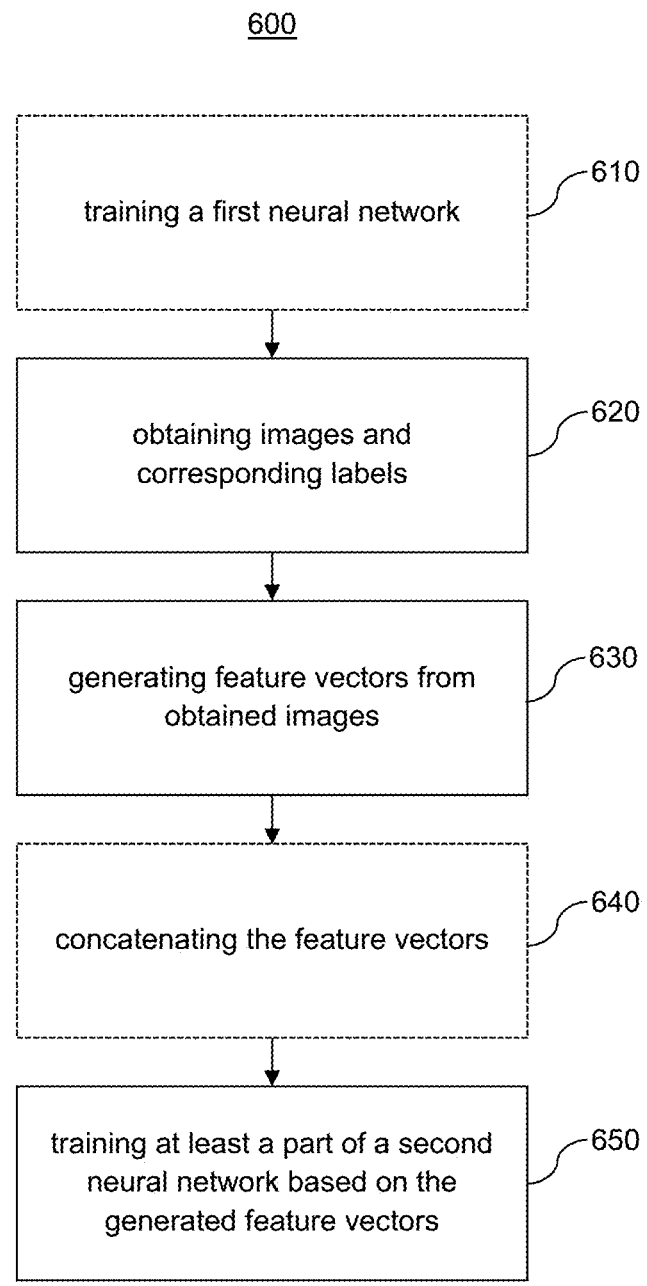
FIG. 6 illustrates a process flow diagram of a method for training at least a part of a neural network for human action recognition.

FIG. 6 illustrates a flowchart depicting an example method 600 for training at least a part of a neural network for human action recognition and pose estimation. Optionally, at 610, a neural network is trained to classify images according to human poses shown in the images based on training images and labels corresponding to the training images. The training images may show one or more humans or at least a part of the one or more humans, and the labels may indicate one or more poses of the one or more humans. The neural network may be trained for estimating 2D and/or 3D human poses of one or more humans or at least a part of the humans shown in an image.

At 620, first sets of one or more images and first labels corresponding to the first sets are obtained. Each set of the first sets of images may include a sequence of images or frames, such as a video sequence. A first label of the first labels may define one or more actions that humans perform in the one or more images of a set of the first sets.

At 630, one or more sets of at least one feature vector are generated by inputting at least one image of each set of the first sets of the one or more images into a first neural network. The sets of at least one feature vector are generated by at least a part of the first neural network, like one or more convolutional layers and/or a RPN module. In various implementations, the first neural network is the neural network trained at 610. Alternatively, the first neural network is obtained together with the first sets of one or more images and the first labels and may be the neural network initially trained for determining human poses.

640 may be optional, as indicated by the dashed lines. In this case, each of the first sets of one or more images include a sequence of images, each set of the sets of at least one feature vector includes a sequence of feature vectors corresponding at least partially to the sequence of images, a plurality of feature vectors of the sequence of feature vectors can be concatenated or stacked at 640.

At 650 and with reference to FIG. 5, at least a part of a second neural network for human action classification is trained based on the sets of at least one feature vector corresponding to the at least one image and at least one corresponding label of the first labels. In various implementations, the training of the second neural network (e.g., the second neural network 580 of the example of FIG. 5) includes training a convolutional layer, such as a one-dimensional (1D) temporal convolutional layer, of the second neural network with the plurality of concatenated feature vectors (e.g., feature vectors of the fully connected layer 540a of FIG. 5). In various implementations, the second neural network 580 may include or consist of a single convolutional layer, which may be a one-dimensional (1D) temporal convolutional layer.

After training, the second neural network may be combined with at least a portion of the first neural network as shown in FIG. 5, such as the portion configured to generate the feature vectors or implicit pose features, to generate a neural network that is configured to predict actions in videos/sequences. The first neural network 502 or at least a portion 575 (omitting those parts identified by 570 which are used in training the first neural network 502) of the first neural network 502 may be configured to generate the feature vectors for each human track/tube (e.g., 420 of FIG. 4, which shows feature vectors 420a, 420b, 420c for one human track/tube) that are stacked/concatenated (e.g., 430 of FIG. 4) and classified at 590 (e.g., 440 of FIG. 4, which shows classifications 442a and 442b) by the second neural network 580.

In various implementations, the second neural network is trained subsequent to the training of the first neural network. In this case, the weights of the first neural network may be frozen during the training of the second neural network, meaning that these weights are not changed during training. The weights of the first neural network can be frozen during training, for example, due to graphics processing unit (GPU) memory constraint or for allowing larger temporal windows to be considered. In various implementations, at least a part of the first neural network is jointly trained with the second neural network based on the first sets of images and the corresponding first labels.

At training, random clips of T consecutive frames may be sampled and a cross-entropy loss may be used, where T is the number of frames. At test time, a fully convolutional architecture may be used for the first neural network and the class probabilities may be averaged by a softmax on the scores for all clips in the videos.

Experimental Results

In various implementations, such as according to the example of FIG. 4, is compared to two different baselines that employ a spatiotemporal graph convolutional network on explicit 3D or 2D pose sequences, respectively. Experimental results are presented for standard action recognition datasets, and a dataset of mimed actions, "Mimetics", to evaluate performances on mimed actions.

FIG. 7 shows an overview of a first baseline 700, which is based on explicit 3D pose information. Given an input video, human tubes are detected and 2D/3D poses (shown only for one tube for readability in FIG. 7) are estimated using LCR-Net++. Then, 3D pose sequences are generated and an action recognition method, which is based on a spatiotemporal graph neural network, is used to obtain action scores. More precisely, a 3D pose, estimated by LCR-Net++, is generated for each candidate box to build a 3D human pose skeleton sequence for each tube. Then, a 3D action recognition method is used for processing the 3D human pose skeleton sequence. The idea includes building a graph in space and time from the pose sequence, on which a spatiotemporal convolution is applied. In the following, the first baseline will be called STGCN3D.

A second baseline is based on 2D poses. This variant of the previous pipeline replaces the 3D poses estimated by LCR-Net++ by its 2D poses. On one hand, this variant is likely to get worse performance, as 3D poses are more informative than 2D poses which are inherently ambiguous. On the other hand, 2D poses extracted from images and videos tend to be more accurate than 3D poses and be more prone to noise. In the following, the second baseline will be called STGCN2D.

TABLE 1

Overview of datasets used in experiments

| | #cls | #vid | #splits | In-the-wild | GT 2D | GT 3D |
|---|---|---|---|---|---|---|
| NTU | 60 | 56,578 | 2 | | Yes | Yes |
| JHMDB | 21 | 928 | 3 | Yes | Yes | |
| PennAction | 15 | 2,326 | 1 | Yes | Yes | |
| HMDB51 | 51 | 6,766 | 3 | Yes | | |
| UCF101 | 101 | 13,320 | 3 | Yes | | |
| Kinetics | 400 | 306,245 | 1 | Yes | | |

Different action recognition datasets with various levels of ground-truth are shown in Table 1, which summarizes the datasets in terms of number of classes, videos, splits, as well as frame-level ground-truths (GT). For datasets with multiple splits, some results are reported on the first split only, denoted for instance as JHMDB-1 for the split 1 of JHMDB. While the implementation of the present invention can be used to perform action recognition in real-world videos, the NTU 3D action recognition dataset that includes ground-truth poses in 2D and 3D can be used to validate the results. The standard cross-subject (cs) split is used. In addition, experiments have been performed on the JHMDB and PennAction datasets that have ground-truth 2D poses, but no 3D poses as these datasets include in-the-wild videos. Further datasets are HMDB51, UCF101, and Kinetics that contain no more information than the ground-truth label of each video. As a metric, the standard mean accuracy, i.e., the ratio of correctly classified videos per class, averaged over all classes is calculated.

For datasets with ground-truth 2D poses, the performance, when using ground-truth tubes (GT Tubes) obtained from GT 2D poses, is compared with the performance when using estimated tubes (LCR Tubes) built from estimated 2D poses. In the latter case, tubes are labeled positive, if the spatiotemporal IoU with a GT tube is over 0.5, and negative otherwise. When there is no tube annotation, it is assumed that all tubes are labeled with the video class label. In the case where no tube is extracted, videos are ignored when training and are considered as wrongly classified for test videos. The Kinetics dataset includes many videos where only the head is visible, and many clips with a first person viewpoint, where only one hand or the main object manipulated during the action is visible. No tubes can be obtained for 2% of the videos on PennAction, 8% on JHMDB, 17% on HMDB51, 27% on UCF101 and 34% on Kinetics.

FIGS. 8A-F show plots of the mean-accuracy of the examples described herein (also called Stacked Implicit Pose Network, SIP-Net in the following) for a varying number of frames T of videos on all datasets, for different tubes (GT or LCR) and features (Pose or Action, extracted at low or high resolution). Overall, a larger clip size T leads to a higher classification accuracy. This is in particular the case for datasets with longer videos such as NTU and Kinetics. This holds both, when using GT tubes and LCR tubes. In various implementations, the number of frames T may be kept at T=32 in the experiments presented below.

In various implementations, a temporal convolution on LCR pose features has been compared to features extracted from a Faster R-CNN model with a ResNet50 backbone trained to classify actions. Such a frame-level detector has been used in various implementations. The LCR-Net++ may be used to extract the LCR pose features. The LCR-Net++ is based on a Faster R-CNN with a ResNet50. Accordingly, the only changes are the learned weights of the network trained to classify actions compared to the LCR-Net++ features.

In this experiment, features from two videos with the actions of "baseball swing" and "bench press" have been extracted with the network trained to classify actions and the LCR-Net++ along tubes. For each sequence, differences (distances) between features along the tube when using Faster R-CNN action or LCR pose features are shown by way of feature correlations. Results show that implicit pose features (LCR pose features) may show more variation inside a tube than Faster R-CNN action features. Specifically, results may show a drop of accuracy when using action features instead of pose features: about 20% on JHMDB-1 and PennAction, and around 5% on NTU for T=32. Pose features considerably increases performance compared to action features, because of the increased differences or distances between features inside tubes. When training a per-frame detector specifically for actions, most features of a given tube are correlated. It may therefore be hard to leverage temporal information from them. In contrast, LCR-Net++ pose features may considerably change over time, as does the pose, deriving greater benefit from temporal integration.

Finally, the impact of the image resolution (at test time) on performance is compared: using features extracted (a) at low resolution, i.e., after resizing the input images such that the smallest side is 320 pixels (following the real-time model of LCR-Net++), and (b) at a higher resolution where the smallest image size is set to 800 pixels (as used to train both Faster R-CNN and LCR-Net++ models). On JHMDB-1, higher resolution may degrade the performance, which can be explained by the relative small size of the dataset and the low quality of the videos. On PennAction and NTU datasets, which include higher resolution videos, features extracted at higher resolution may lead to an improvement of about 1% and 10%, respectively. The small resolution set-up is kept in some implementations for speed reasons, especially for large-scale dataset such as Kinetics.

TABLE 2

Mean accuracies (in %) for the SIP-Net approach and the two baselines on datasets with GT tubes, or when using LCR tubes.

| Method | Tubes | JHMDB-1 | PennAction | NTU (cs) |
|---|---|---|---|---|
| STGCN2D | GT | 22.7 | 92.5 | 69.5 |
| STGCN3D | GT | 59.5 | 95.3 | 75.4 |
| SIP-Net | GT | 73.7 | 96.4 | 66.7 |
| STGCN2D | LCR | 19.2 | 76.4 | 67.2 |
| STGCN3D | LCR | 60.9 | 88.4 | 73.0 |
| SIP-Net | LCR | 65.2 | 90.6 | 63.3 |

Table 2 shows the results of a comparison of the implementation of the present invention and the first and the second baselines using GT and LCR tubes, on the JHMDB-1, PennAction, and NTU datasets. For the datasets JHMDB-1 and PennAction, the present application, despite being a much simpler architecture compared to the baselines, outperforms the baselines based on explicit 2D-3D pose representations, both with GT and LCR tubes. Estimated 3D pose sequences are usually noisy and may lack temporal consistency. Moreover, the first baseline significantly outperforms its 2D counterpart, confirming that 2D poses contain less discriminative and more ambiguous information.

On the NTU dataset, the 3D pose baseline may obtain a 75.4% accuracy when using GT tubes and estimated poses, compared to 81.5% when using ground-truth 3D poses. This gap of 6% in a constrained environment may increase for videos captured in the wild. The performance of the implementation of the present invention is lower, 66.7% on GT tubes, but as observed in FIGS. 8A-F, this may be due to the low resolution at which the features are extracted. At higher resolution, 77.5% can be obtained, on par with the STGCN3D.

TABLE 3

Mean accuracies (in %) for the SIP-Net, the two baselines on all datasets using LCR tubes, and for pose-based approaches.

| | JHMBD-1 | JHMBD | PennAction | NTU (cs) | HMB51-1 | HMB51 | UCF101-1 | UCF101 | Kinetics |
|---|---|---|---|---|---|---|---|---|---|
| STGCN2D | 19.2 | 20.2 | 76.4 | 67.2 | 33.3 | 32.7 | 42.1 | 42.2 | 13.4 |
| STGCN3D | 60.9 | 54.5 | 88.4 | 73.0 | 31.4 | 31.7 | 41.4 | 41.5 | 12.2 |
| SIP-Net | 65.2 | 59.6 | 90.6 | 63.3 | 42.9 | 44.2 | 54.1 | 52.4 | 22.9 |
| PoTion | 59.1 | 57.0 | — | — | 46.3 | 43.7 | 60.5 | 65.2 | 16.6 |
| Zolfaghari et al. (pose only) | 45.5 | — | — | 67.8 | 36.0 | — | 56.9 | — | — |
| Multitask (with RGB) | — | — | 97.4 | 74.3 | — | — | — | — | — |
| STGCN (3D with OpenPose) | 25.2 | 25.4 | 71.6 | 79.8 | 38.6 | 34.7 | 54.0 | 50.6 | 30.7 |

Table 3 provides a comparison of the classification accuracy on all datasets when using LCR tubes (first three rows). The present invention (SIP-Net), which is based on implicit pose features, significantly outperforms other methods that employ explicit 2D and 3D poses, with a gap of more than 10% on HMDB51, UCF101, and Kinetics. This shows the robustness of this representation compared to explicit body key point coordinates. Interestingly, on HMDB51, UCF101, and Kinetics, the 2D pose baseline performs slightly better than the 3D, suggesting noisy 3D pose estimates.

Further, Table 3 shows a comparison between the present application and the pose-based methods. For the present application compared to PoTion, a higher accuracy can be obtained with a margin of 3% on JHMDB, 0.5% on HMDB51 and 6% on Kinetics, and a lower accuracy on UCF101. In some videos of the dataset UCF101, the humans are too small to be detected and no tube can be built. Compared to some pose models, a higher accuracy can be obtained on the first split of JHMDB and HMDB51 and a lower accuracy on UCF101 for the same reason as above, as well as on NTU due to the low-resolution processing. On NTU and PennAction, some methods obtain a higher accuracy, because their approach also leverages appearance features. When combining the present application with a standard RGB stream using a 3D ResNeXt-101 backbone, a mean accuracy of 98.9% can be obtained on the PennAction dataset.

To assess the bias of action recognition algorithms towards scenes and objects, and to evaluate their generalizability in absence of such visual context, Mimetics, a dataset of mimed actions may be used to evaluate the present application. Mimetics includes short video clips from YouTube of mimed human actions that include interactions with or manipulations of certain objects. These include sport actions, such as playing tennis or juggling a soccer ball, daily activities such as drinking, personal hygiene (e.g., brushing teeth), or playing musical instruments including bass guitar, accordion or violin. These classes were selected from the action labels of the Kinetics dataset, allowing evaluating models trained on Kinetics. Mimetics is used for testing purposes only, meaning that the tested neural networks were not trained on this dataset. Mimetics includes 619 short videos for a subset of 45 human action classes with 10 to 20 clips for each action. These actions are performed on stage or on the street by mime artists, but also in everyday life, typically during mimed games, or are captured and shared for fun on social media. For instance, videos show indoor surfing or soccer players mimicking the action "bowling" to celebrate a goal. The clips for each class were obtained by searching for candidates by key words such as miming or imitating followed by the desired action, or using query words such as imaginary and invisible followed by a certain object category. The dataset was built making sure that a human observer was able to recognize the mimed actions. Care has been taken to make sure that clips of a same class do not overlap and do not contain common material, i.e., the same person miming the same action with the same background. The videos have variable resolutions and frame rates and have been manually trimmed to a length between 2 and 10 seconds, following the Kinetics dataset.

TABLE 4

Top-k accuracies and mean average-precision (in %) on the Mimetics dataset.

| | top-1 | top-5 | top-10 | mAP |
|---|---|---|---|---|
| RGB 3D-ResNeXt-101 | 8.9 | 21.3 | 28.8 | 15.8 |
| STGCN (2D with OpenPose) | 9.2 | 25.5 | 34.5 | 18.1 |
| STGCN2D | 9.5 | 22.7 | 31.2 | 17.2 |
| STGCN3D | 10.4 | 25.5 | 34.4 | 18.8 |
| SIP-Net | 11.3 | 26.3 | 37.3 | 19.3 |

Results for the Mimetics dataset are shown in Table 4. All methods are trained on the 400 classes of Kinetics and tested on the videos of the Mimetics dataset. Table 4 shows the top-1, top-5, and top-10 accuracies as well as the mean average-precision (mAP). As each video has a single label, average-precision computes for each class the inverse of the rank of the ground-truth label, averaged over all videos of this class. The two baselines and the implementation of the present invention have been compared with other methods based on OpenPose, as well as a spatiotemporal 3D deep convolutional network trained on clips of 64 consecutive RGB frames. A code release has been used with spatiotemporal 3D convolutions.

The performance is relatively low for all methods, below 12% top-1 accuracy and 20% mAP, showing that the recognition of mimed actions is challenging. In fact, all methods may perform poorly for some actions including climbing a ladder, reading newspaper, driving a car, and bowling. For the action driving a car, the person tends to be highly occluded by the car in the training videos, leading to incorrect pose estimations. For bowling, while mimes often face the camera when imitating the action, training videos may be captured from the back or the side. In many cases, mimes tend to exaggerate (e.g., when performing air guitar or reading journal) and are therefore difficult to classify correctly. Another difficulty for all methods is that some Kinetics actions are fine-grained (e.g., different classes correspond to eating various types of food) and are hard to distinguish, especially when mimed. This suggests problems related to the training data.

The best overall performance is achieved using the present application including a temporal convolution applied on stacked implicit pose representations, possibly reaching 11.3% top-1 accuracy and a mAP of 19.3%. Note that 3% of the Mimetics videos have no LCR tubes, typically when people are too small or in case of very near close-ups, impacting the performance of the 2 baselines and the present application, which may be based on LCR-Net++. Another failure case occurs when several people are present in the scene. The tubes can erroneously mix several humans or other persons, e.g., spectators, simply obtain higher scores than the one miming the action of interest.

Furthermore, all of the pose-based methods outperform the 3D-ResNeXt baseline on average. For some classes, such as archery, playing violin, playing bass guitar, playing trumpet, or playing accordion, 3D-ResNeXt may obtain 0% while other methods may perform reasonably well. Therefore, action recognition methods may learn to detect the objects being manipulated or the scenes where the video is captured more than the performed actions.

3D-ResNeXt may perform well for classes in which the object is poorly visible in the training videos, since it is either too small (e.g., a cigarette) or mostly occluded by hands (e.g., baseball ball, toothbrush, hairbrush). In such cases, 3D-ResNeXt focuses on face and hands (e.g., for brushing teeth, smoking, brushing hair) or on the body (e.g., throwing baseball) and therefore performs well on these mimed actions. It also reaches a good performance for actions for which most Mimetics videos were captured in a scene relevant for the mimed actions. For example, 70% of the Mimetics videos of dunking basketballs may have been mimed (without a ball) on a basketball rim. The 3D-ResNeXt method may successfully classify these videos (all in the top-5), but may fail for other videos of this class that do not take place near a basketball backboard, showing that it mainly leverages the scene context.

Finally, when comparing the present application to other pose-based methods, a better performance can be achieved compared to other methods based on OpenPose for actions where a large object occludes one of the subject's arm (e.g., playing violin, playing accordion). This may be due to the fact that LCR-Net++ outputs full-body poses even in the case of occlusions, in contrast to OpenPose that only produces a prediction for visible limbs. Moreover, the present application may outperform the 3D baseline for classes like playing trumpet, for which the actors are only partially visible most of the time. 3D poses are noisy, whereas the present application offers more robustness.

While some specific embodiments have been described in detail above, it will be apparent to those skilled in the art that various modifications, variations and improvements of the embodiments may be made in the light of the above teachings and within the content of the appended claims without departing from the intended scope of the embodiments. In addition, those areas in which it is believed that those of ordinary skill in the art are familiar have not been described herein in order not to unnecessarily obscure the embodiments described herein. Accordingly, it is to be understood that the embodiments are not to be limited by the specific illustrative embodiments, but only by the scope of the appended claims.

Although the above embodiments have been described in the context of method steps, they also represent a description of a corresponding component, module or feature of a corresponding apparatus or system.

Some or all of the method steps or functions described above may be implemented by a computer in that they are executed by (or using) one or more processors, one or more microprocessors, one or more electronic circuit, or processing circuitry.

The embodiments described above may be implemented in hardware or a combination of hardware and software. The implementation can be performed using a non-transitory storage medium such as a computer-readable storage medium, for example a floppy disc, a DVD, a Blu-Ray, a CD (compact disc), a read only memory (ROM), a PROM, and EPROM, an EEPROM, a random access memory (RAM), or a FLASH memory. Such computer-readable media can be any available media that can be accessed by a general-purpose or special-purpose computer system.

Generally, embodiments can be implemented as a computer program product with a program code or computer-executable instructions, the program code or computer-executable instructions being operative for performing one of the methods when the computer program product runs on a computer. The program code or the computer-executable instructions may be stored on a computer-readable storage medium.

In an embodiment, a storage medium (or a data carrier, or a computer-readable medium) comprises, stored thereon, the computer program or the computer-executable instructions for performing one of the methods described herein when it is performed by a processor. In a further embodiment, an apparatus comprises one or more processors and the storage medium mentioned above.

In a further embodiment, an apparatus comprises means, for example processing circuitry, e.g., a processor communicating with a memory, the means being configured to, or adapted to perform one of the methods described herein.

A further embodiment includes a computer having installed thereon the computer program or instructions for performing one of the methods described herein.

While the embodiments are described with respect to human action recognition, those skilled will appreciate that the above embodiments may be used for individual action recognition, where individual is used herein to include humans, animals, and inanimate objects such as robots. An individual may be a living object and/or a moving object that may be part of a particular class, species, or collection.

Figure 9:
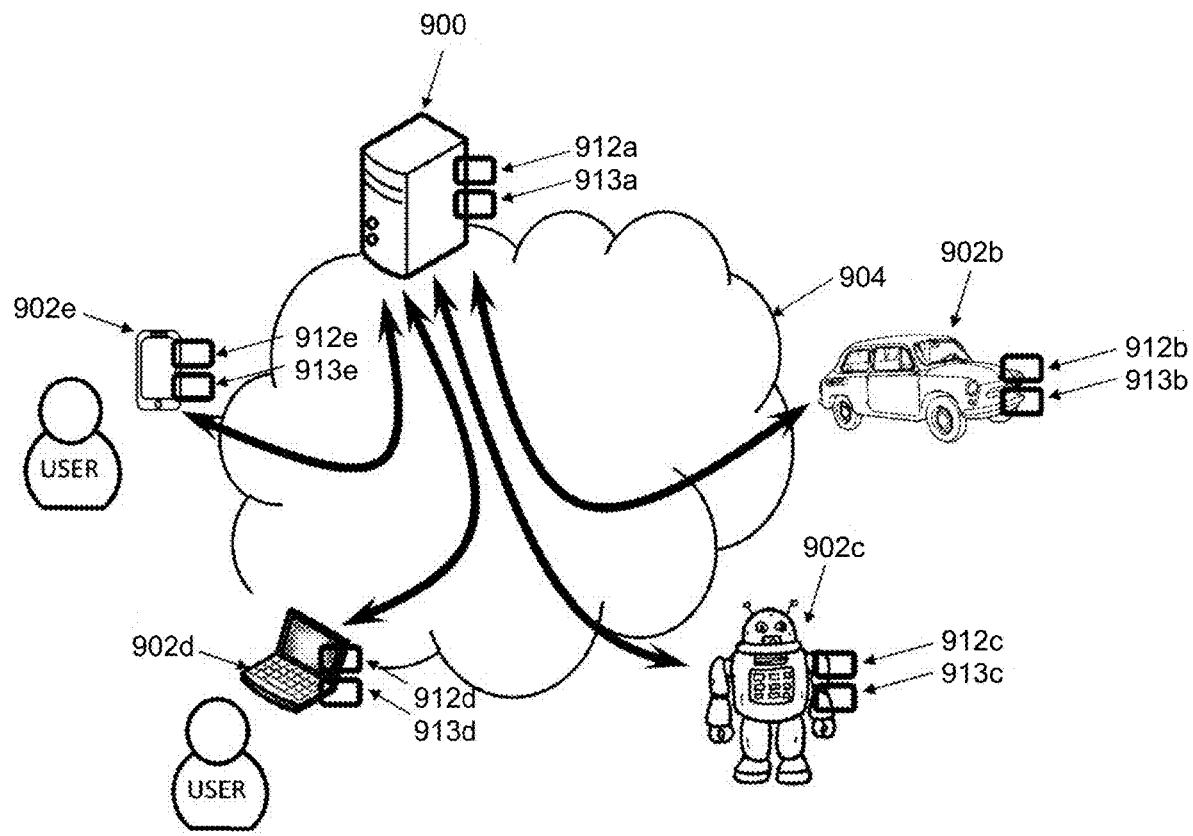
FIG. 9 illustrates an example architecture in which the disclosed methods may be performed.

The above-mentioned methods and embodiments may be implemented within an architecture such as illustrated in FIG. 9, which includes server 900 and one or more client devices 902 that communicate over a network 904 (which may be wireless and/or wired) such as the Internet for data exchange. Server 900 and the client devices 902 include a data processor (or more simply processor) 912 (e.g., 912*a*, 912*b*, 912*c*, 912*d*, 912*e*) and memory 913 (e.g., 913*a*, 913*b*, 913*c*, 913*d*, 913*e*) such as a hard disk. The client devices 902 may be any type of computing device that communicates with server 900, such as autonomous vehicle 902*b*, robot 902*c*, computer 902*d*, or cell phone 902*e*.

More precisely in an embodiment, the training and classifying methods according to the examples of FIGS. 1 to 3 and 6 may be performed at the server 900. In other embodiments, the training and classifying methods according to the embodiments of FIGS. 1 to 3 and 6 may be performed at client device 902. In yet other embodiments, the training and classifying methods may be performed at a different server or on a plurality of servers in a distributed manner.

A novel approach that leverages implicit pose representations, which may be carried by mid-level features learned by a pose detector without using explicit body key point coordinates is disclosed.

The ability to classify images or videos according to actions performed in these images or videos is relevant for several technical tasks. For example, the present application allows for indexing videos based on the content of the videos and not only on the metadata, like the title of the video, which might be misleading or unrelated to the content of the video. For example, in the context of indexing a large amount of videos for search applications, like a search engine, search results can be provided in response to a search request based on the relevance of the search request with respect to the actual content of the videos and not only the metadata of the video. Moreover, present application allows for providing advertising that is relevant in view of or associated with content of a video. For example, video-sharing websites, such as Snow, may provide advertising specific to the content of a video. Alternatively or additionally, when watching videos on a webpage, other videos could be recommended based on the content of the video. Furthermore, in the context of robotics and autonomous driving, the present application can be used to recognize actions performed by humans nearby. For example, a human may interact with a robot that can determine actions or gestures performed by the human. Moreover, an autonomous vehicle can detect dangerous human behavior, comprising an action that is classified as dangerous, and the vehicle can adapt its speed accordingly or perform an emergency break. Furthermore, embodiments of the present invention may applied in the field of video gaming. A user may play without any remote controller.

The methods described herein may outperform methods based on neural networks, which operate on 3D skeleton data or body key point coordinates, with respect to accuracy of predicting results for real-world 3D action recognition. Implicit pose representations, like deep pose-based features from a pose detector, like LCR-Net++, may perform significantly better than deep features specifically trained for action classification.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

While the disclosed embodiments describe systems and methods for generating whole body poses for humans, the present application is also applicable to generating whole body poses and determining actions of other types of animals (e.g., dogs, cats, etc.) with the appropriate training.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A computer-implemented method of recognition of actions performed by individuals, the method comprising:
   by one or more processors, obtaining images including at least a portion of an individual;
   by the one or more processors, based on the images, generating implicit representations of poses of the individual in the images, the implicit representations including feature vectors and not including key points and not including 2 dimensional (2D) or three dimensional (3D) individual skeleton data; and
   by the one or more processors, determining an action performed by the individual and captured in the images by classifying the implicit representations of the poses of the individual.

2. The method of claim 1, further comprising deriving key points with three dimensional (3D) coordinates corresponding to a pose of a skeleton of the individual from the implicit representations.

3. The method of claim 1, wherein the generating the implicit representations includes generating the implicit representations of the poses of the individual in the images using a first neural network.

4. The method of claim 3, further comprising training the first neural network to determine at least one of two dimensional (2D) and three dimensional (3D) poses of individuals in images.

5. The method of claim 1, wherein determining the action performed by the individual includes determining the action by classifying the implicit representations of the poses using a second neural network.

6. The method of claim 5, further comprising training the second neural network to classify feature vectors according to actions by individuals.

7. The method of claim 1, wherein the individual includes a human, the poses include human poses, and the action includes an action performed by a human.

8. The method of claim 1, wherein the images include a sequence of images from a video.

9. The method of claim 1, wherein:
generating the implicit representations includes generating the implicit representations based on the images, respectively;
the method further includes concatenating the implicit representations to produce a concatenated implicit representation; and
the determining the action includes performing a convolution on the concatenated implicit representation to produce a final implicit representation and determining the action performed by the individual by classifying the final implicit representation.

10. The method of claim 9, wherein the convolution is a one dimensional (1D) convolution.

11. The method of claim 9, wherein the convolution is a one dimensional (1D) temporal convolution.

12. The method of claim 1 further comprising, by the one or more processors, determining candidate boxes around individual captured in the images,
wherein generating the implicit representations includes generating the implicit representations based on the candidate boxes.

13. The method of claim 12 further comprising, by the one or more processors, extracting tubes from the images based on the candidate boxes.

14. The method of claim 12, wherein determining the candidate boxes includes determining the candidate boxes using a regional proposal network (RPN) module.

15. A system, comprising:
one or more processors; and
memory including code that, when executed by the one or more processors, perform functions including:
obtaining images including at least a portion of an individual;
based on the images, generating implicit representations of poses of the individual in the images, the implicit representations including feature vectors and not including key points and not including 2 dimensional (2D) or three dimensional (3D) individual skeleton data; and
determining an action performed by the individual and captured in the images by classifying the implicit representations of the poses of the individual.

* * * * *